United States Patent
Soendker et al.

(10) Patent No.: US 9,269,940 B2
(45) Date of Patent: Feb. 23, 2016

(54) SYSTEM FOR BYPASSING AND ISOLATING ELECTRICAL POWER CELLS

(75) Inventors: Erich H. Soendker, Granada Hills, CA (US); Joel Edward Bruemmer, Simi Valley, CA (US)

(73) Assignee: AEROJET ROCKETDYNE OF DE, INC., Canoga Park, CA (US)

(*) Notice: Subject to any disclaimer, the term of this patent is extended or adjusted under 35 U.S.C. 154(b) by 739 days.

(21) Appl. No.: 13/325,538

(22) Filed: Dec. 14, 2011

(65) Prior Publication Data

US 2013/0154392 A1 Jun. 20, 2013

(51) Int. Cl.
| | |
|---|---|
| *H02H 3/00* | (2006.01) |
| *H01M 2/20* | (2006.01) |
| *H01M 10/42* | (2006.01) |
| *H01M 10/48* | (2006.01) |
| *B60L 3/04* | (2006.01) |
| *H01H 9/54* | (2006.01) |

(52) U.S. Cl.
CPC .......... *H01M 2/204* (2013.01); *H01M 10/4207* (2013.01); *H01M 10/482* (2013.01); *B60L 3/04* (2013.01); *H01H 9/541* (2013.01); *Y10T 29/49117* (2015.01); *Y10T 307/74* (2015.04); *Y10T 307/747* (2015.04); *Y10T 307/937* (2015.04)

(58) Field of Classification Search
USPC ............................................. 361/86, 87, 91.1
See application file for complete search history.

(56) References Cited

U.S. PATENT DOCUMENTS

| | | | | |
|---|---|---|---|---|
| 3,809,959 | A * | 5/1974 | Pucher | 361/8 |
| 6,249,063 | B1 * | 6/2001 | Rudoy et al. | 307/125 |
| 6,570,340 | B1 * | 5/2003 | Davis | 315/170 |
| 2010/0123358 | A1 * | 5/2010 | Pasquier | 307/125 |

* cited by examiner

*Primary Examiner* — Danny Nguyen
(74) *Attorney, Agent, or Firm* — Joel G. Landau

(57) ABSTRACT

An electrical power cell system including first and second electrical power cells having first and second terminals, one or more transient voltage suppressors connected in parallel with a relay, the relay having two states, the first state of the relay connects the first and second electrical power cells in series, and the second state of the relay bypasses the first electrical power cell so that the first electrical power cell is not connected in series with the second electrical power cell.

16 Claims, 4 Drawing Sheets

SYSTEM FOR BYPASSING AND ISOLATING ELECTRICAL POWER CELLS

BACKGROUND

The current invention is related to electrical power cell isolation, and in particular to a system and method for bypassing and isolating a malfunctioning electrical power cell.

Electrical power systems often consist of several electrical power cells connected in series to provide larger voltages than a single cell can produce. In a system such as this, if a cell malfunctions, the cell can create high impedance and essentially disable the entire string of electrical power cells. Critical systems, such as those in space, require continuous operation and cannot be disabled whenever a single electrical power cell malfunctions.

For systems that require continuous operation, it is essential to have the ability to isolate and bypass a malfunctioning electrical power cell. To provide continuous operation, and not cause any damage to the system, the circuit must be able to provide a continuous path for current flow in the event of an electrical power cell malfunction. If a switch is used to isolate and bypass a malfunctioning electrical power cell, the circuit must have the ability to prevent a large voltage spike created by high impedance during throw time of the switch.

Prior circuits provided diodes in parallel with the electrical power cells so that when the electrical power cell malfunctioned, and created a high impedance, current would flow through the diode, bypassing the malfunctioning cell. This setup allowed for uninterrupted current flow, but created excessive power loss through the diode as the diode provided a continuous conduction path with high power dissipation.

Other bypass circuits utilized a more costly approach involving switches in conjunction with diodes and a fuse. When the electrical power cell malfunctioned, the diodes would allow current to flow through the fuse, tripping the fuse, and activating a switch to bypass the damaged cell. Because the switch was thrown by blowing a fuse, the act of setting the switch was irreversible. The only way to reactivate the cell was to replace the switching mechanism.

SUMMARY

A system and method for automatically isolating and bypassing an electrical power cell, the system including an electrical power cell, a relay with two states that is thrown from the first state to the second state in order to isolate and bypass the electrical power cell, and one or more transient voltage suppressors to absorb power during throw time of the relay.

DETAILED DESCRIPTION

The present invention describes an electrical power cell bypass and isolation system that allows an electrical power cell, such as a battery cell or a solar cell, to be isolated and bypassed, and then later reconnected to the system. In particular, the system contains a relay having relay coils and single-pole double-throw switches, and one or more transient voltage suppressors, such as transorbs. The first state of the relay is used during normal operation to allow current to flow through the operational electrical power cell. The relay can be thrown to its second state so that current bypasses the electrical power cell. Current is routed through the transient voltage suppressors during throw time of the relay.

Figure 1:
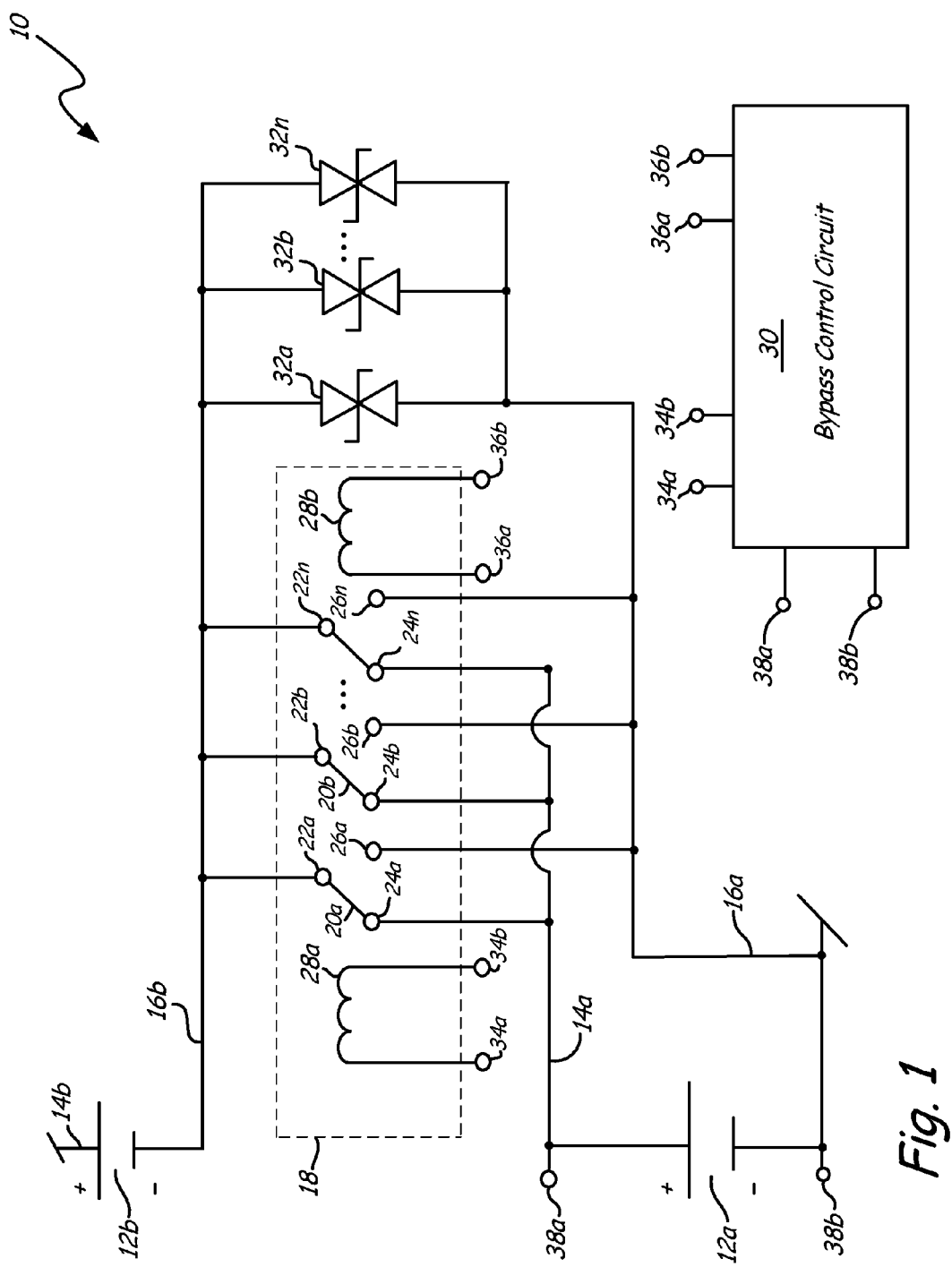
FIG. 1 is a block diagram of an embodiment of the present invention.

FIG. 1 is a block diagram illustrating an embodiment of electrical power cell bypass and isolation system 10. In this embodiment, system 10 includes first and second electrical power cells 12a-12b, conductors 14a-14b and 16a-16b, relay 18, switches 20a-20n, switch common nodes 22a-22n, first switch outputs 24a-24n, second switch outputs 26a-26n, first and second relay coils 28a-28b, bypass control circuit 30, transient voltage suppressors 32a-32n, relay coil terminals 34a-34b and 36a-36b, and cell terminals 38a-38b.

First and second electrical power cells 12a-12b may be implemented as solo electrical power cells, virtual electrical power cells, or any other electrical power cell combination or arrangement. Although illustrated schematically as batteries, electrical power cells 12a-12b can take other forms, such as solar cells. Only two electrical power cells 12a-12b are illustrated, but the series connection of electrical power cells may contain many electrical power cells, each with an associated bypass and isolation system like system 10 shown in FIG. 1.

Relay 18 has two states and is made of up of single-pole double-throw switches 20a-20n which are actuated by first and second relay coils 28a-28b. While displayed schematically with two relay coils 28a-28b, switches 20a-20n may be actuated using a single relay coil. First switch outputs 24a-24n provide the first relay state in which there is a path between conductor 14a and conductor 16b. This path allows current to flow freely through first electrical power cell 12a to the rest of the system. Second switch outputs 26a-26n provide the second relay state in which there is a path between conductor 16a and conductor 16b. This path allows current from the system to bypass first electrical power cell 12a. The number of switches 20a-20n necessary for the relay depends upon the amount of current during normal system operation. For example, if the present embodiment operates with 72 amperes, and each switch is rated to handle 30 amperes, then the relay will require 3 switches in parallel.

Bypass control circuit 30 monitors the functionality of first electrical power cell 12a by monitoring cell terminals 38a-38b. A malfunction of first electrical power cell 12a may be detected if, for example, bypass control circuit 30 detects a high impedance across cell terminals 38a-38b. During normal operation, switches 20a-20n are latched to their respective first outputs 24a-24n, placing relay 18 in its first state. This is accomplished by providing a pulse to first relay coil 28a. In this operating mode, current passes through first electrical power cell 12a, relay 18, and second electrical power cell 12b. Current may flow in either direction, depending upon whether the electrical power cells are charging or discharging.

When bypass control circuit 30 detects that first electrical power cell 12a is malfunctioning, it provides a pulse to relay coil 28b in order to throw the switches from first outputs 24a-24n to second outputs 26a-26n respectively, placing relay 18 in its second state. Once relay 18 is in its second state, current flows freely around first electrical power cell 12a from conductor 16a, through relay 18, to conductor 16b, thus isolating first electrical power cell 12a from the rest of the system.

During the throw time of relay 18, there is high impedance created between the common nodes and outputs of switches 20a-20n. This creates a transient voltage which, if unhandled, could cause arcing across the contacts of switches 20a-20n. To prevent unwanted arcing and/or other damage to the system, transient voltage suppressors 32a-32n are connected in parallel with relay 18. Therefore, during the throw time of relay 18, current is routed through transient voltage suppressors 32a-32n. After throw time, the connections to second switch outputs 26a-26n provide a short across transient voltage suppressors 32a-32n and first electrical power cell 12a is properly isolated from the system.

The number of transient voltage suppressors 32a-32n required for the system depends on the energy rating of each transient voltage suppressor. To determine the required energy rating, the amount of energy to be withstood by transient voltage suppressors 32a-32n must be calculated for the given system using the following equation:

$$\text{Energy} = T_{MAX} * V_{MAX} * I_{MAX};$$

where $T_{MAX}$=maximum throw time of relay 18;
$V_{MAX}$=maximum voltage across transient voltage suppressors 32a-32n; and
$I_{MAX}$=maximum current through system 10.

In one embodiment, the maximum throw time of relay 18 may be 15 milliseconds, the maximum voltage across transient voltage suppressors 32a-32n may be 7 volts, and the maximum current for the system may be 72 amperes. Thus, 7.56 joules is the energy transient voltage suppressors 32a-32n must withstand. Therefore, if each transient voltage suppressor is rated to withstand 5 joules, the system would require two such transient voltage suppressors in parallel.

Figure 2:
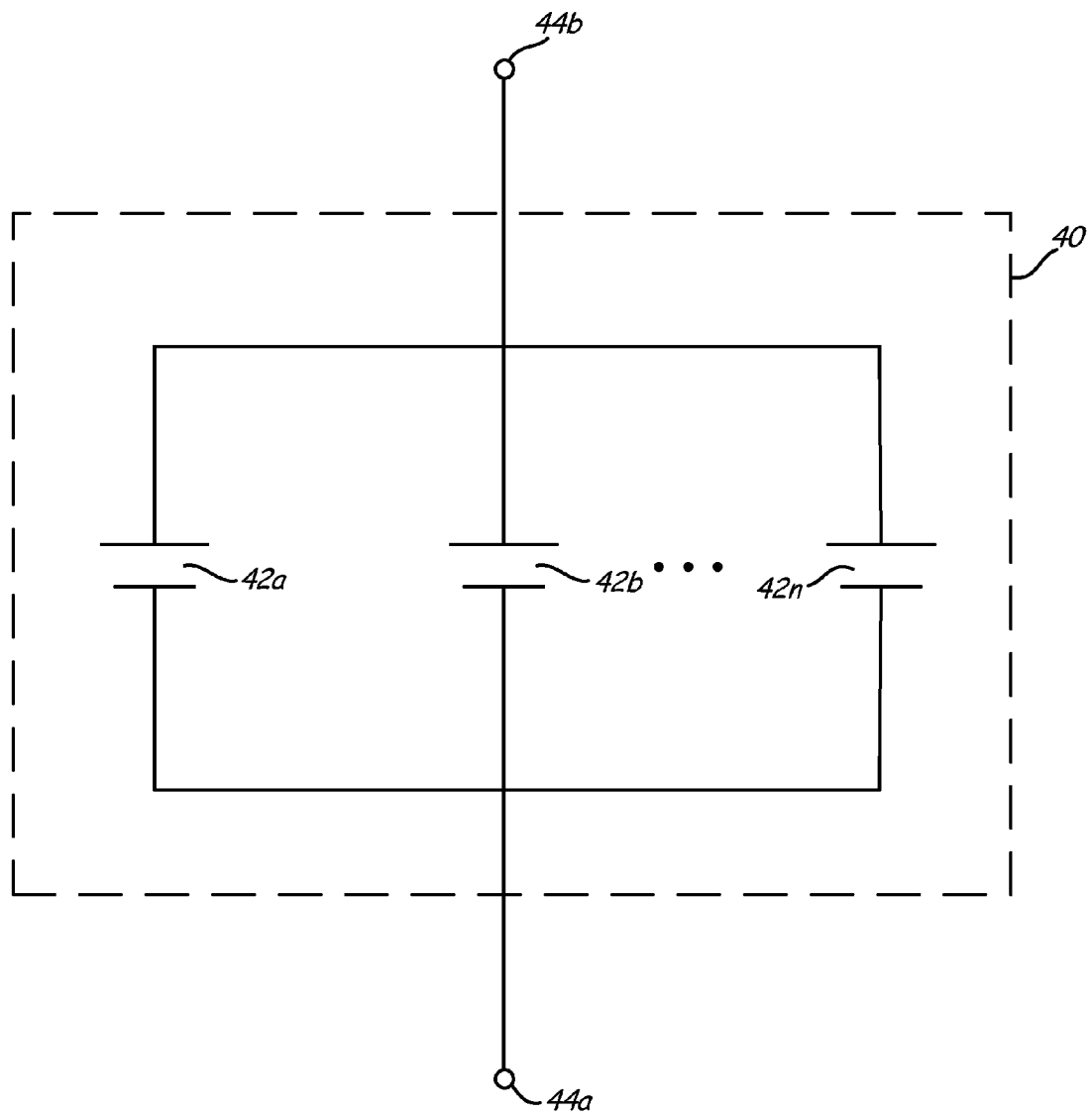
FIG. 2 is a block diagram illustrating a virtual electrical power cell according to an embodiment of the present invention.

FIG. 2 is a block diagram showing an embodiment of a virtual electrical power cell 40. In this embodiment, virtual electrical power cell 40 includes electrical power cells 42a-42n connected in parallel, and first and second terminals 44a and 44b. Although illustrated schematically as batteries, electrical power cells 42a-42n can take other forms, such as solar cells.

One or both of electrical power cells 12a-12b of FIG. 1 could be implemented as a virtual electrical power cell 40. For instance, if replacing electrical power cell 12a with virtual electrical power cell 40, first terminal 44a would be connected to conductor 16a, and second terminal 44b would be connected to conductor 14a.

Figure 3:
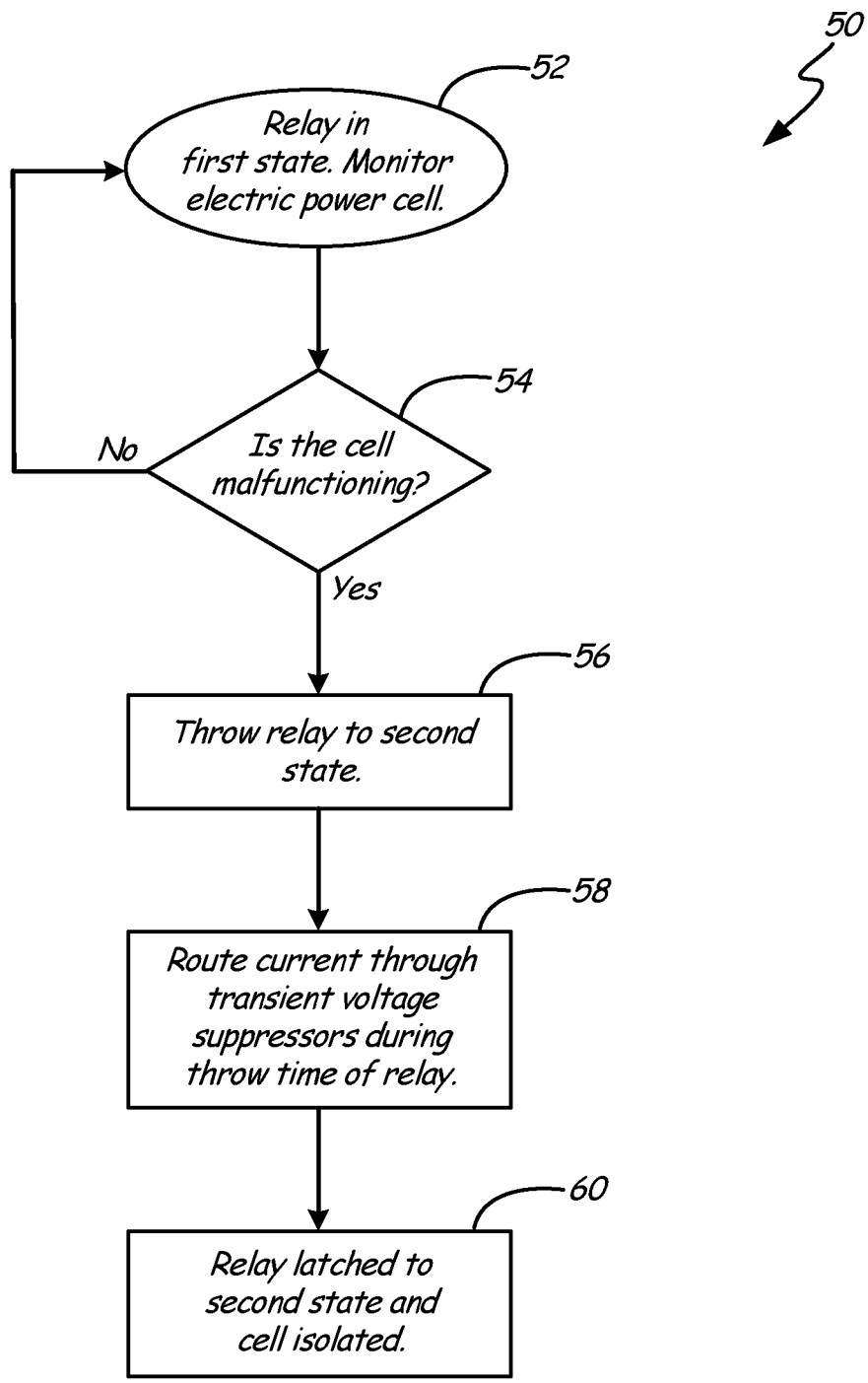
FIG. 3 is a flow chart illustrating a method of bypassing a malfunctioning electrical power cell according to an embodiment of the present invention.

FIG. 3 is a flowchart illustrating a detailed method 50 of isolating and bypassing a malfunctioning electrical power cell. At step 52, in order to place relay 18 in its first state, bypass control circuit 30 provides a pulse to first relay coil 28a. Bypass control circuit 30 then begins to monitor the voltage across first electrical power cell 12a. At step 54, bypass control circuit 30 determines if first electrical power cell 12a is malfunctioning. If first electrical power cell 12a is not malfunctioning, relay 18 remains in its first state and bypass control circuit 30 continues to monitor the voltage across first electrical power cell 12a. If a malfunction of first electrical power cell 12a is detected, then bypass control circuit 30 proceeds to step 56. At step 56, bypass control circuit places relay 18 in its second state by providing a pulse to relay coil 28b. This throws switches 20a-20n from first outputs 24a-24n to second outputs 26a-26n. At step 58, while switches 20a-20n are being thrown, current is routed through transient voltage suppressors 32a-32n. At step 60, relay 18 remains in its second state providing a short across transient voltage suppressors 32a-32n and a bypass around now isolated first electrical power cell 12a.

Reversibility of relay 18 is desirable during installation of an electrical power system. In systems containing a high number of electrical power cells connected in series, installing the final few cells can be especially hazardous for an installer. The potential across the already installed cells would create a dangerous situation. For example, if there is to be a total of 30 electrical power cells connected in series, each having a rating of 4 volts, by the time the installer has to physically connect the final cell there is a live 116 volts that the installer must worry about. The ability to isolate the already installed cells would take away this danger. Once all cells had been installed, relay 18 could be reversed, and the electrical power cells connected for normal system functionality.

In another embodiment of the present invention, first electrical power cell 12a may be isolated from the rest of a series of electrical power cells during installation of an electrical power system, such as a lithium-ion battery system. After installing first electrical power cell 12a, the installer may isolate electrical power cell 12a from the series of cells, by putting relay 18 in its second state. Therefore, the installer would only have to deal with, at most, the voltage of a single electrical power cell during the entire installation process. Then, once all the cells are installed, each relay 18 may be reversed to its first state, allowing current to flow through all the cells and providing the full potential across the electrical power system.

Figure 4:
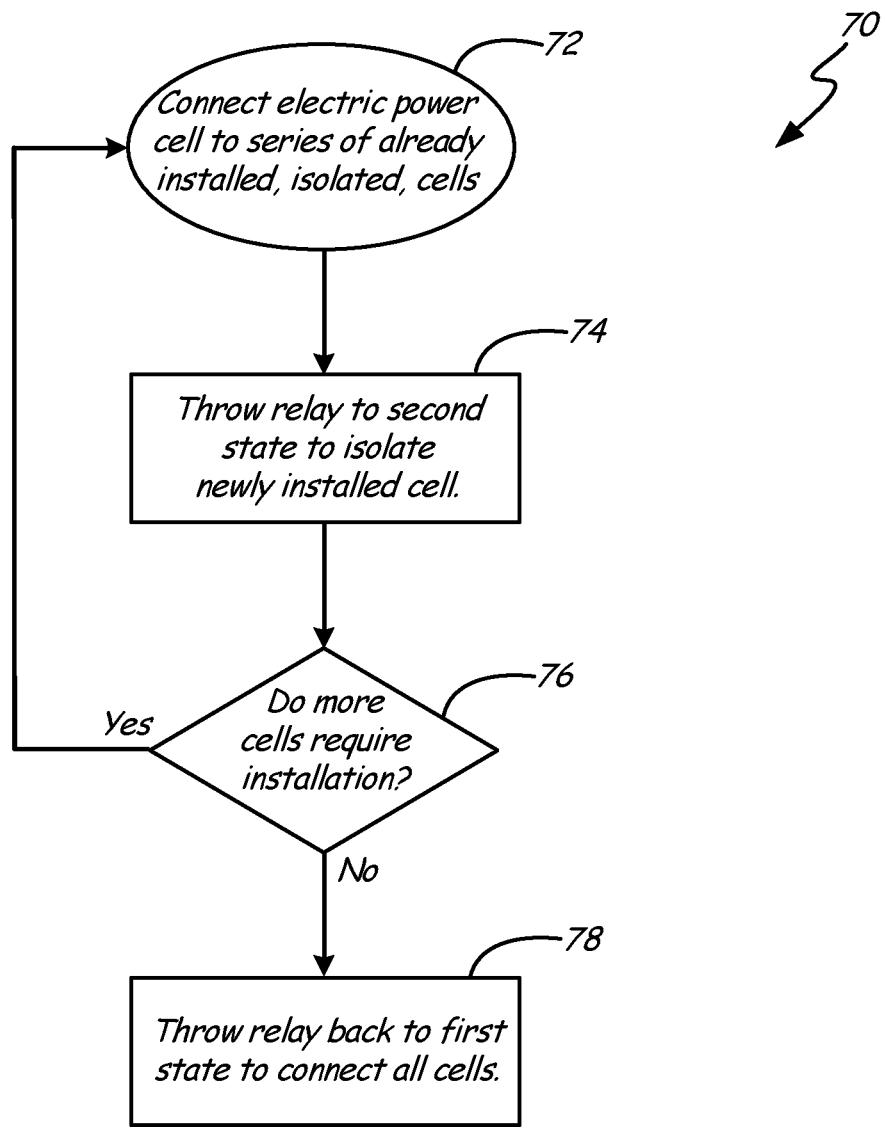
FIG. 4 is a flow chart illustrating a method of installing a series of electrical power cells according to an embodiment of the present invention.

FIG. 4 is a flowchart illustrating a detailed method 70 for installing a series of electrical power cells using an electrical power cell bypass and isolation circuit. At step 72, first electrical power cell 12a is connected to a series of already installed, isolated, electrical power cells. During installation time, relay 18 is set to its first state having switches 20a-20n connected to first outputs 24a-24n in order to test the functionality of the newly installed first electrical power cell 12a. At step 74, once first electrical power cell 12a has been successfully installed, relay 18 is set to its second state by throwing switches 20a-20n to connect outputs 26a-26n, isolating newly installed first electrical power cell 12a from the rest of the series of electrical power cells. At step 76, if any more electrical power cells require installation, steps 72-76 are repeated. At step 78, once all electrical power cells have been successfully installed in the series of electrical power cells, all relays 18 are placed back into their respective first states, activating all cells of the newly installed electrical power system.

In this way, the present invention provides a system and method for bypassing and isolating electrical power cells. Although the present invention has been described with reference to preferred embodiments, workers skilled in the art will recognize that changes may be made in form and detail without departing from the spirit and scope of the invention.

The invention claimed is:

1. An electrical power cell bypass and isolation system comprising:
    first and second electrical power cells;
    a reversible relay having first and second states, the first state of the relay connects the first and second electrical power cells in series, and the second state of the relay bypasses the first electrical power cell so that the first and second electrical power cells are not connected in series; and
    one or more transient voltage suppressors connected in parallel with the relay.

2. The system of claim 1, wherein the first state of the relay connects the first and second electrical power cells in series by providing a connection between a second terminal of the first power cell and a first terminal of the second electrical power cell, and the second state of the relay bypasses the first electrical power cell by providing a path between a first terminal of the first electrical power cell and the first terminal of the second electrical power cell.

3. The system of claim 1, wherein a bypass control circuit controls the relay and detects a malfunction of the first electrical power cell.

4. The system of claim 3, wherein the relay comprises a plurality of single-pole double-throw switches, and an actuator mechanism comprising one or more relay coils.

5. The system of claim 4, wherein the one or more transient voltage suppressors are connected with each other in parallel.

6. The system of claim 1, wherein the first and second electrical power cells are virtual electric power cells, each consisting of a plurality of electrical power cells.

7. A method for isolating and bypassing a first electrical power cell of a plurality of electrical power cells, the method comprising:

latching a reversible relay to a first state in which the first electrical power cell electrically connected in series with the plurality of electrical power cells;

monitoring operation of the first electrical power cell;

upon detection of a malfunction of the first electrical power cell, throwing the relay to a second state that bypasses the first electrical power cell so that it is not connected in series with the plurality of electrical power cells; and routing current through one or more transient voltage suppressors during throw time of the relay.

8. The method of claim 7, wherein a bypass control circuit controls the relay and detection of the malfunction.

9. The method of claim 8, wherein the bypass control circuit operates the relay through the use of an actuator mechanism comprising one or more relay coils.

10. The method of claim 7, wherein the electrical power cell is a virtual electrical power cell comprised of a plurality of electrical power cells.

11. A method for installing electrical power cells into a series circuit of electrical power cells, the method comprising:

a. installing into the series circuit an electrical power cell together with an electrical power cell isolation circuit capable of isolating the electrical power cell from other electrical power cells in the series circuit;

b. after installation of the electrical power cell, isolating the electrical power cell from the series circuit of electrical power cells using a reversible relay of the electrical power cell isolation circuit;

c. repeating steps a and b until all electrical power cells have been installed in the series circuit of electrical power cells; and d. using the electrical power cell isolation circuits to connect in series all electrical power cells of the series circuit by no longer isolating the cells.

12. The method of claim 11, wherein the electrical power cell isolation circuit comprises a relay with first and second states, and one or more transient voltage suppressors connected in parallel.

13. The method of claim 12, wherein the first state of the relay connects the electrical power cell in series with the series circuit, and the second state of the relay bypasses the electrical power cell.

14. The method claim of 13, wherein the electrical power cell isolation circuit further comprises a bypass control circuit capable of controlling the relay.

15. The method claim of 14, wherein the bypass control circuit controls the relay using an actuator device having one or more relay coils.

16. The method of claim 11, wherein the electrical power cell is a virtual electric power cell comprising a plurality of electrical power cells.

\* \* \* \* \*